United States Patent [19]

Siol et al.

[11] Patent Number: 5,155,172

[45] Date of Patent: Oct. 13, 1992

[54] ELASTOMERIC ACRYLIC RESINS

[75] Inventors: Werner Siol, Darmstadt; Klaus Albrecht, Mainz; Michael Müller, Alsbach-Hahnlein; Klaus Koralewski, Riedstadt, all of Fed. Rep. of Germany

[73] Assignee: Rohm GmbH Chemische Fabrik, Darmstadt, Fed. Rep. of Germany

[21] Appl. No.: 472,251

[22] Filed: Jan. 30, 1990

[30] Foreign Application Priority Data

Jan. 30, 1989 [DE] Fed. Rep. of Germany ....... 3902653

[51] Int. Cl.$^5$ .................. C08F 265/06; C08F 291/12; C08F 291/14; C08L 35/02
[52] U.S. Cl. ...................................... 525/308; 525/73; 525/80; 525/205; 525/212; 525/218; 525/227; 525/228; 525/230; 525/302
[58] Field of Search ............... 525/302, 308, 73, 80, 525/205, 212, 218, 227, 228, 230

[56] References Cited

U.S. PATENT DOCUMENTS

| | | | |
|---|---|---|---|
| 3,786,116 | 1/1974 | Milkovich et al. | 525/276 |
| 3,862,098 | 1/1975 | Milkovich | 525/308 |
| 3,862,101 | 1/1975 | Milkovich | 525/308 |
| 4,312,726 | 1/1982 | Vrancken | 525/308 |
| 4,521,567 | 6/1985 | Arndt | 525/308 |
| 4,722,976 | 2/1988 | Ceska | 525/308 |
| 4,900,791 | 2/1990 | Siol | 525/303 |
| 5,053,461 | 10/1991 | Tone et al. | 525/309 |

FOREIGN PATENT DOCUMENTS 0357036 3/1990 European Pat. Off.
3909756 10/1989 Fed. Rep. of Germany.

OTHER PUBLICATIONS

Journal of Polymer Science, Part B, Polymer Letters, vol. 5 (1967), pp. 477–481 (P. 477 only provided): "Graft Copolymers With Short Side Chains".
Macromolecules, vol. 13 (1980), pp. 216–221, American Chemical Society; K. Ito et al., "Syntheses of Methyl Methacrylate-Stearyl Methacrylate Graft Copolymers and Characterization by Inverse Gas Chromatography".
Makromolecukulare Chemie, vol. 186 (1985) pp. 261–271; C. Bonardi et al.: "Synthese et Copolymerisation avec L'Acrylamide de Marcromonomeres D'Acrylate de Dodecyle".

Primary Examiner—James J. Seidleck
Assistant Examiner—Vasu S. Jagannathan
Attorney, Agent, or Firm—Oblon, Spivak, McClelland, Maier & Neustadt

[57] ABSTRACT

Elastomers based on acrylates, which are comprised, in the amount of at least 40 wt. % and as much as 100 wt. %, of one or more copolymers having a molecular weight >50,000 daltons and comprised of units of:
i) acrylate monomers in the amount of 50–95 wt. %, and
ii) macromonomers comprised of a vinylic group and, covalently bonded with such group, a polyvinyl unit selected from the group of acrylates and methacrylates and having a glass transition temperature Tg at least 60° C. and molecular weight 500–100,000 dalton.

14 Claims, No Drawings

ELASTOMERIC ACRYLIC RESINS

BACKGROUND OF THE INVENTION

1. Field of the Invention

The invention relates to elastomeric acrylic resins (EARs) comprised of acrylic acid ester and macromonomer moieties having a glass transition temperature Tg above 60° C.

2. Discussion of the Background

The general usage of the term "elastomer" is to describe materials which can be stretched to at least twice their initial length by application of a moderately low force at room temperature and higher temperatures, and which, after the force is released, return quickely and practically completely to their original size and shape. For a long time the term was synonymous with "rubber" (see Stoekhert, G., "Kunststoff-Lexikon", 6th Ed., pub. Carl Hanser Verlag, Munich).

The prerequisite for elastomeric properties is regarded to be the presence of macromolecules with an extensive flexible chain structure, and in a state distinctly above the glass transition temperature Tg of the macromolecules. Additional prerequisites include a low degree of crystallization of the macromolecules in the non-deformed state, and intermolecular crosslinking of individual chains to form a three-dimensional network which is indissoluble. (See Kirk-Othmer, 1979, "Encyclopedia of Chemical Technology", 3rd Ed., Vol. 8, pub. J. Wiley, pp. 446-469.)

Typical acrylate elastomers such as are currently used in a wide range of industrial applications are polymers and copolymers of acrylic acid esters, with ethyl acrylate and butyl acrylate as the main components. They are particularly resistant to oils and have relatively high thermal stability. The principal disadvantage of such acrylate elastomers is considered to be the fact that they become stiff upon cooling, and are brittle at relatively high temperatures comparatively speaking.

In addition to principally radical-mediated crosslinking of polymers with low glass transition temperatures, elastomers can be produced also by polyaddition reactions; e.g., elastomers based on polyurethane (PUR).

Beside covalently crosslinked PURs, PURs are available which are "physically" crosslinked. Such elastomers are thermoplastically processible.

Whereas with classical "rubber" the crosslinking (i.e., vulcanization) is a slow, irreversible process, which occurs under heating, in the "thermoplastic elastomers" there is a transition from the moldable melt to the elastomeric solid, upon cooling, which transition proceeds quickly and reversibly. (See Mark, H. F., et al., 1986, "Encyclopedia of polymer science and engineering", 2nd Ed, Vol. 5, pub. J. Wiley & Sons, pp. 416-430.)

According to the prevailing view, "thermoplastic elastomers" comprise multiphase systems wherein the phases are intimately interdispersed. In many cases (chemical) bonding via block- or graft copolymerization may play a role, whereas in other cases it seems apparent that a high degree of dispersion is sufficient. As a rule, at least one of the phases is comprised of a polymer material which is "hard" at room temperature but liquid upon heating. A second phase is as a rule comprised of a "soft" material which has rubberlike elasticity at room temperature. The most industrially important materials are thermoplastic block copolymers the "hard" segments of which are comprised of, e.g., polystyrene, polysulfone, polyester, polyurethane, or polycarbonate, and the "soft" segments of which may be comprised of polybutadiene, polyisoprene, polyethylene-butylene copolymers, polydimethylsiloxane, or polyethers. Transparent thermoplastic elastomers based on polyacrylate esters with polystyrene graft branches have been described by G. O. Schulz and R. Milkovich (1982, J. Appl. Polym. Sci., 27:4773-4786). The synthesis of these polyacrylate esters with polystyrene side chains proceeds on the basis of styrene macromonomers such as obtained with very narrow molecular weight distribution according to R. Milkovich et al. (U.S. Pat. No. 3,786,116). In such copolymers the "crosslinking" can be interpreted as association of glass-like or crystalline "hard" blocks into the associated polymer structure.

A factor common to all of the above-mentioned thermoplastic elastomers is that they have very high stress at failure (according to the test of DIN 53 455) but relatively low extensibility. Their weather resistance is also unsatisfactory.

The elastomers according to the known art belong to a variety of polymer classes, and they display the technical weaknesses inherent in these classes.

The "thermoplastic elastomers" are generally inferior to the corresponding vulcanized products in a few quality-related parameters, e.g. compressibility, solvent resistance, and retention of shape under heating. (See Mark, H. F. et al., "Encyclopedia of polymer science and engineering", Vol. 5, loc. cit.)

SUMMARY OF THE INVENTION

Accordingly, one object of the invention is to provide a way to use of the numerous very good properties of acrylate resins in devising elastomeric plastics based on such resins, particularly in devising thermoplastic elastomers of this type.

It has been discovered, in connection with the invention, that certain copolymers produced from acrylate esters are elastomers with outstanding properties.

The inventive elastomers based on acrylates are comprised, in an amount of at least 40 wt.% (based on the total weight of the elastomer polymer), of one or more copolymers having a M.W. > 50,000 daltons and comprised of units of:

(i) acrylate monomers in the amount of 50-95 wt.%, and (ii) macromonomers comprised of a vinylic group and, covalently bonded with such a group, a polyvinyl unit selected from the group of acrylates and methacrylates and having a glass transition temperature Tg at least 60° C., preferably at least 90° C., and a M.W. 500-100,000, preferably 2,000-50,000 daltons.

DETAILED DESCRIPTION OF THE PREFERRED EMBODIMENTS

The nonuniformity, $(M_w - M_n)/M_n$, of the inventively employed macromonomers is as a rule greater than 0.3, particularly greater than 0.5. (For determination of molecular weights, see Mark, H. F. et al., ibid., Vol. 5., pp. 1-19.).

In the elastomers, the macromonomer phases which are incompatible with the polyacrylate main chains act as physical crosslinking loci. At temperatures above the glass transition temperature of these macromonomer phases, the materials are thermoplastically processible provided that there is not covalent crosslinking present as well.

However, both types of elastomer are of technical interest, i.e., the purely physically crosslinked acrylate ester-macromonomer copolymers and the additionally covalently crosslinked acrylate ester-macromonomer copolymers, but the purely physically crosslinked acrylate ester-macromonomer copolymers are of particular importance.

Of interest are elastomeric acrylate resins (EARs) comprised of:

A) 60–100 wt.%, particularly 60–99.9 wt.%, of copolymers with a M.W.>50,000 daltons, preferably in the range 100,000–1,000,000 daltons, comprised of units follows:

a) 50–95 wt.%, preferably 70–90 wt.%, based on the total weight of the monomer components of (A), of monomers or monomer mixtures of formula I

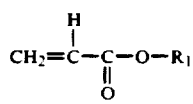

(I)

b) 5–50 wt.%, preferably 10–30 wt.%, of macromonomers or macromonomer mixtures of formula II or III

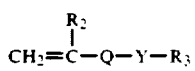

(II)

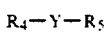

(III)

with the molecular weight of the macromonomers in the range 500–100,000 daltons, preferably in the range 2,000–50,000 daltons, particularly preferably in the range 5,000–30,000 daltons, and glass transition temperature Tg at least 60° C.;

c) 0–45 wt.%, preferably 0.1–20 wt.%, based on the sum of the weights of (a) and (b), of a different vinyl compound Vm which is copolymerizable with (a) and (b);

B) 40-0 wt.%, particularly 40-0.1 wt.%, of polymers not copolymerized with (I), which polymers (B) are comprised of units of monomers forming the polymer chains Y, and have a molecular weight in the range 500–100,000 daltons, where $R_1$ represents an alkyl group with 1–12 carbon atoms; $R_2$ represents hydrogen or methyl; $R_3$ represents hydrogen or an alkyl group with 1–24 carbon atoms; $R_4$ and $R_5$ represent hydrogen or an alkyl group with 1–24 carbon atoms; or a hydrocarbon group with 2–20 carbon atoms and containing a —$CH_2$=CH— or —$CH_2$=$CCH_3$—group; wherewith if $R_4$ contains a —$CH_2$=CH— or —$CH_2$=$CCH_3$—group then $R_5$ does not (and vice versa); Y represents a polymer chain selected from the following structural units:

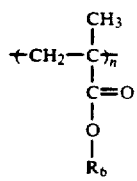

(IV)

or

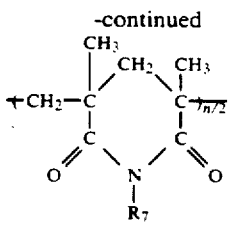

(V)

where $R_6$ represents methyl, ethyl, isopropyl, cycloalkyl with preferably 5–8 carbon atoms in the ring, or (optionally substituted) phenyl; $R_7$ represents alkyl with 1–8 carbon atoms, or aryl (particularly phenyl), which aryl is optionally substituted with an alkyl group with 1–4 carbon atoms; n is such that the molecular weight of the macromonomer is in the range 500–100,000 daltons; and Q is a bifunctional organic group which joins the polymer chain Y to the polymerizable unit $CH_2$=$CR_2$—.

Preferably n is a number in the range 10–500. In the monomer of formula I, $R_1$ preferably represents ethyl, butyl, propyl, hexyl (isomers thereof which are commonly used), or 2-ethylhexyl. Further, $R_3$ preferably represents hydrogen, if the macromonomer has been produced by radical polymerization (according to a preferred embodiment of the production method), or otherwise $R_3$ represents hydrogen or an alkyl group with 1–24 carbon atoms, in the case of production of the macromonomer by group transfer polymerization (GTP); Y preferably represents a polymer of methyl methacrylate, particularly such a polymer with a content of methyl methacrylate of at least 80 wt.%, i.e. preferably $R_6$ represents methyl; or Y represents copolymers of styrene or alpha-methylstyrene with acrylonitrile; or Y represents N-substituted polyglutarimides such as can be obtained, e.g., by reacting polymethyl methacrylate units with N-alkylamines (particularly N-methylamine); and Y may contain in its polymer chain a lesser amount (i.e., <40 wt.%) of other monomer units. $R_7$ preferably represents methyl. If $R_7$ represents substituted phenyl, preferably the substituents comprise alkyl groups with 1–4 carbon atoms.

The copolymerizable vinyl compounds Vm are monomers different from (a) and (b) and are used in proportions of 0–45 wt.%, preferably 0.1–40 wt.%, particularly preferably 0.1–20 wt.%, based on the total weight of monomers (a) and (b). Preferably Vm represents (meth)acrylonitrile or (meth)acrylamide, or a vinyl ester (e.g. vinyl acetate or vinyl propanoate), or styrene or substituted styrene (particularly p-methylstyrene).

By definition, component (B) is a polymer of type Y which is not covalently linked to component (A), and may be an unreacted residual macro monomer or a polyvinyl compound of type Y which contains no vinyl groups and therefore does not represent a "macromonomer". As a rule, this polymer component is obtained s a byproduct in the industrial scale macromonomer synthesis. Component (B) is preferably contained in the EARs in propostions 0.1–40 wt.%, more preferably 0.5–20 wt.%. Surprisingly, it was determined that such byproducts may be present in high proportions without detriment to the useful properties of the elastomer.

The bifunctional group Q is preferably one of the following:

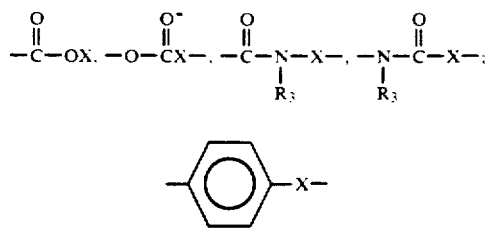

where $R_3$ is as described above; and X represents an alkylidene group with 2-24 carbon atoms, preferably an alkylidene group which contains at least one oxygen, sulfur, or nitrogen atom. The macromonomers preferably contain sulfur. The following types of groups are particularly preferred as the group X:

$-CH_2CH_2-S-$, and $-CH_2CH_2-\overset{H}{\underset{}{N}}-\overset{O}{\underset{}{C}}-O-CH_2-CH_2-S-$ In a particularly preferred embodiment of the invention, the EAR is comprised of:

A) 60-100 wt.% of copolymers of:
   a') Ethyl acrylate, butyl acrylate, or 2-ethylhexyl acrylate, in the amount of 50-95 wt.%; and
   b') A macromonomer of formula II' or II", in the amount of 5-50 wt.%, where II' and II" are, respectively

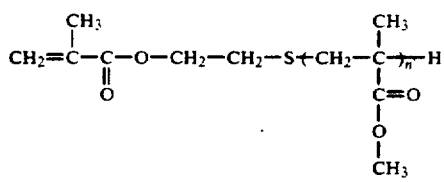

where n' represents 10-500; and

B) 40-0.1 wt.% of a polymer of type

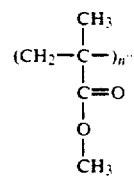

where n" represents a number in the range 10-500. Also of particular interest are EARs containing two different but mutually compatible macromonomers as the main segments. As an example of such an embodiment one might mention blends of a") A copolymer comprised of butyl acrylate in the amount of 50-95 wt.% and a macromonomer of formula II"

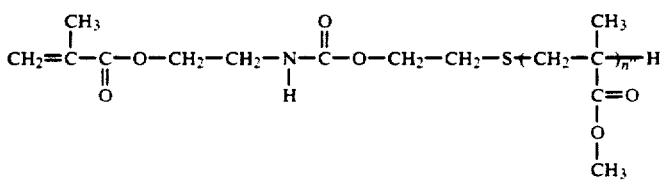

in the amount of 50-5 wt.%; and b") copolymers comprised of butyl acrylate in the amount of 50-95 wt.% and a macromonomer of formula II'''

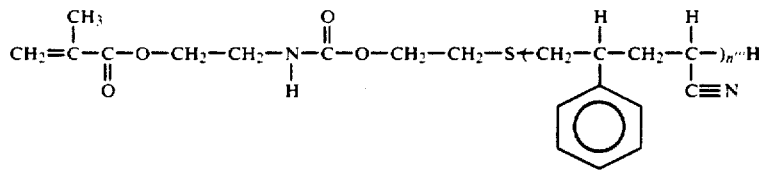

in the amount of 50-5 wt.%; where n" and n''' each represents a number in the range 5-500. As a rule, the copolymers have a molecular weight in the range 50,000-2,000,000 daltons.

Such systems can be pour-formed (molded) from solution, extruded, injection molded, or pressformed. Thus, they are thermoplastically processible elastomers.

Polymerization Method

Preferably, radical polymerization is used to produce

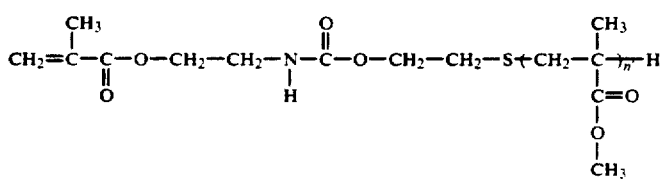

the copolymers (see Rauch-Puntigam, H., and Voelker, Th., 1967, "Acryl- und Methacrylverbindungen", pub.

Springer-Verlag, Berlin). The polymerization may be carried out, e.g., in solution in known fashion.

Candidates for use as solvents are inert solvents such as esters, e.g. butyl acetate or ethyl acetate; ketones such as acetone; hydrocarbons such as toluene. etc.

The customary peroxy compounds in organic solvents are used as accelerators, e.g. tert-butyl perneodecanoate or dibenzoyl peroxide; or azo compounds, e.g. azobisisobutyronitrile (AIBN).

The accelerators are ordinarily used in amounts of 0.01-2 wt.%, based on the weight of the monomer(s). It is recommended that the molecular weight of the polymers be controlled by addition of regulators, e.g. the customary sulfur regulators, such as 2-ethylhexyl thioglycolate or tert-dodecyl mercaptan, in customary amounts of 0.01-2 wt.%, based on the weight of the monomer(s).

As is customary, the polymerization is started by increasing the temperature and is carried out at elevated temperature, such as about 60° C. Advantageously an inert protective gas is used, e.g. argon. The duration of the polymerization is in the customary range, e.g. several hours, ordinarily about 5±2 hr. According to a refinement of the invention, crosslinking monomers are used, i.e. compounds having more than one vinyl double bond in the molecule.

Examples are (meth)acrylate esters (or -amides) of diols and polyols (or of diamines and polyamines); e.g., triacrylate of 2,2-dihydroxymethyl-1-butanol, or ethylene glycol dimethacrylate. In general, the amount of crosslinking agent added is in the range 0.01-5 wt.%, based on the total weight of the monomer(s).

Thus, e.g., mixtures of monomers of formula I and macromonomers of formula II and/or III can be hardened with addition of crosslinking monomers, to form plates or other molded bodies.

Particularly preferred, however, are EARs which are not yet covalently crosslinked, at least not before the processing stage, and which have molecular weights in the range 100,000-10,000,000 daltons.

The Macromonomers

Macromonomers are known to be obtainable by anionic or cationic "living polymerization", or by radical polymerization. The polymerizable end group is ordinarily introduced at initiation or in a chain break or else in a subsequent chemical transformation.

Thus, e.g., the compound

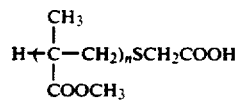

can be produced by radical polymerization of methyl methacrylate (MMA) with azobisisobutyronitrile (AIBN) in the presence of thioglycolic acid; upon further reaction with glycidy methacrylate, the macromonomer of formula

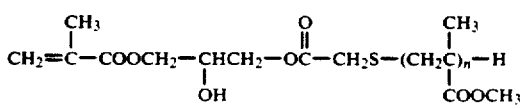

is produced.

In an analogous process with 2-mercaptoethanol and AIBN, the compound

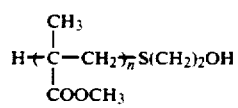

is obtained, which upon further reaction with

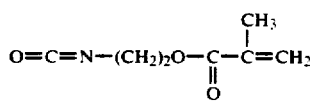

in toluene, catalyzed by di-n-butyltin dilaurate at about 40° C., leads to the macromonomer II''

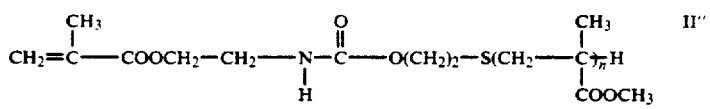

By definition the macromonomers are polymers with a polymerizable (particularly by radical polymerization) end group, in the molecular weight range 500 to about 100,000, preferably in the molecular weight range 2,000-50,000 daltons. The production of macromonomers is described in detail in the literature (Rempp, P. F., and Franta, E., 1984, Adv. Polym. Sci., 58:1; Albrecht, K., and Wunderlich, W., 1986, Angew. Makromol. Chem., 145/146:89-100; Mark, H. et al., loc. cit., Vol. 9, pp. 195-204; Rempp, P., Franta, E., Masson, P., and Lutz, P., 1986, Progr. Colloid & Polym. Sci., 72:112-118; Rempp, P. et al., 1982, Makromol. Chem. Rapid Commun., 3:499-504; Corner, T., 1984, "Advances in polymer science", Vol. 62, pp. 95-141; Rempp, Paul F., and Franta, Emile, ibid., Vol. 58, pp. 1-50; Gnanou, Yves, and Lutz, Pierre, 1989, Makromol. Chem., 190:577-588; Tsukahara, Y. et al., 1989, Macromolecules, 22:1546-1552; Tsukahara, Y. et al., 1989, Polym. J., 21:377-391.)

(see Albrecht, K., and Wunderlich, W., loc.cit.). Of particular interest is the polymerization of methyl methacrylate (or the ethyl, isopropyl, cycloalkyl, or an optionally substituted phenyl ester of methacrylic acid) with 1-10 wt.% of 2-mercaptoethanol, followed by reaction of the resulting polymer with methacrylic acid anhydride. Particularly preferred macromonomers are those of type II' obtained by this method.

Another interesting possibility for producing the macromonomers is that of the group transfer polymerization (GTP) method (see Mark, H. F. et al., loc. cit., Vol. 7, pp. 580-588).

Molecular weight is determined by gel permeation chromatography (see Mark, H. F. et al., loc. cit., Vol. 10, pp. 1-19).

Glass transition temperature Tg is determined according to Turi, E. A., 1981, "Thermal characterization of polymeric materials", pub. Academic Press, N.Y.; and Vieweg-Esser, 1975, "Kunststoff-Handbuch", Vol.

9 ("Polymethacrylate"), pub. Carl Hanser Verlag, pp. 333-340.

The Elastomeric Acrylic Resins (EARs)

The EARs according to the invention are comprised of:

A) 60-100 wt.% of a copolymer of the following composition:

a) An acrylate ester of formula I, in the amount of 50-95 wt.%;

b) A macromonomer of formula II or III, in the amount of 50-5 wt.%; and c) A vinyl compound Vm copolymerizable with (a) and (b), with Vm being present in the copolymer (A) in the amount of 0-45 wt.%; and B) 40-0 wt.% of a polyvinyl compound not covalently linked to (A), which compound (B) has the same chemical structure as the macromonomer or will form mixtures compatible with the macromonomer.

Of particular importance for the useful properties of the EARs are the proportion of macromonomer II or III in copolymer (A), and the ratio of the molecular weight of macromonomer II or III to that of copolymer (A).

In this connection, the following rule applies for the inventive EARs: The molecular weight of copolymer (A) multiplied by the weight fraction of the macromonomer in the copolymer must be clearly greater than the molecular weight of the macromonomer of formula II or III.

As a rule, $$\frac{Mw_{Copolymer\ A} \times Xw_{Macromonomer}}{Mw_{Macromonomer}} > 2$$

Preferably, $$\frac{Mw_{Copolymer\ A} \times Xw_{Macromonomer}}{Mw_{Macromonomer}} > 3$$

More preferably, $$\frac{Mw_{Copolymer\ A} \times Xw_{Macromonomer}}{Mw_{Macromonomer}} > 5$$

Even more preferably, $$\frac{Mw_{Copolymer\ A} \times Xw_{Macromonomer}}{Mw_{Macromonomer}} > 8$$

In these expressions, $Mw_{Copolymer\ A}$ represents the mean molecular weight of copolymer A, $Mw_{Macromonomer}$ represents the mean molecular weight of the macromonomer, and $Xw_{Macromonomer}$ represents the weight fraction of the macromonomer in copolymer A. $Xw_{Macromonomer}$ = wt. % of the macromonomer divided by 100 wt.%.

Of particular interest are copolymers of type (A) which do not have an extremely narrow molecular weight distribution.

Accordingly, macromonomers such as are obtained by radical polymerization of vinyl monomers with a functional regulator followed by reaction of the functional group to produce the macromonomer, are preferred.

Of interest for the present EARs are macromonomers with a nonuniformity > 0.3, preferably > 0.7. Also, as a rule a nonuniformity of > 0.3 is found for copolymer (A). Preferred are copolymers (A) having nonuniformity > 0.7, particularly > 1.2, and more particularly > 2.2.

Of particular interest is the fact that the chemical nonuniformity of the copolymer can also be considerable, as long as the above-mentioned criteria regarding the molecular weight of copolymer (A) and macromonomer II or III, and regarding the weight fraction of the macromonomer in the copolymer, are satisfied.

Thus, the EARs may contain polymers (B) which are chemically identical to or are compatible with the macromonomer(s), with such polymers (B) being present in the amount of 0.1-40 wt.%. As a rule, these polymers (B) have molecular weights which are approximately equal to that of the macromonomer. However, additional polymers (B) may be added which have molecular weights substantially different from that of the macromonomer (generally as a rule higher).

Of particular importance for the applications properties of the present EARs is the constraint that the main chain of the copolymer (A) (which is essentially comprised of units of the monomers I and Vm), be incompatible with the macromonomers in the temperature range $-50°$ to $+100°$ C., with the upper limit of this range preferably being at least $+200°$ C., and particularly preferably at least $+250°$ C.

In this connection, in accord with Ger. OS 37 08 427 of Mar. 16, 1987, which describes compatible polymer mixtures comprised of poly(meth)acrylates, as a rule $R_1$ and $R_6$ are not the same. Rather, the case is of particular interest in which $R_1$ and $R_6$ differ by at least 1 carbon atom, preferably at least 2 carbon atoms, and particularly preferably at least 3 carbon atoms. Particularly interesting is the case in which $R_1$ is a hydrocarbon group comprising butyl, pentyl, hexyl, or 2-ethylhexyl, and $R_6$ is methyl.

Also of particular importance is the case in which $R_1$ is (as above) butyl, pentyl, hexyl, or 2-ethylhexyl; the proportion of the copolymerizable vinyl compound Vm in copolymer (A) is $< 20$ wt.%, preferably $< 10$ wt.%; and in the macromonomer the polymer chain y is comprised of units of formula V where the group $R_7$ is methyl. Also, of particular interest is a macromonomer of type II, in that generally macromonomers of II are preferred over macromonomers of type III.

The present EARs may also contain additives which are per se known, e.g. stabilizers and processing aids, added in the customary amounts (see GaechterMueller, 1979, "Kunststoff-Addition", pub. Carl Hanser Verlag). For example, as protective agents against light and aging, sterically hindered amines have proved particularly suitable, e.g. the products commercially available under the trademark Tinuvin ®.

The present EARs are distinguished by high weather resistance along with high shape retention under heating. In the un-filled state, they are transparent.

The elongation at failure (according to DIN 53 455) can be very high, e.g. > 1000%. Of particular technical importance are the following possibilities:

(a) pour-casting the EARs from solution, to form films; and (b) mechanical forming of a granulate of the elastomer, by press-forming, injection pressing, injection molding, blow-forming, and extruding.

Also particularly worthy of interest is the posibility of reforming intermediate objects produced from the present elastomeric materials, e.g. reforming by means of deep drawing.

The thermoplastic processability also enables recovery and reprocessing of wastage and other forms of scrap material.

Having generally described this invention, a further understanding can be obtained by reference to certain specific examples which are provided herein for purposes of illustration only and are not intended to be limiting unless otherwise specified.

EXAMPLES

Example 1:

Synthesis of a polymethyl methacrylate with hydroxyl end groups 4 g mercaptoethanol and 0.2 g azobisisobutyronitrile (AIBN) were added to 200 g methyl methacrylate, and polymerization was carried out in a plastic reactor 48 hr at 50° C., under a protective inert gas.

The polymer was dissolved in acetone and precipitated out in petroleum ether. The resulting polymethyl methacrylate had a molecular weight Mw=10,400.

Example 2:

Synthesis of a polymethyl methacrylate monomer corresponding to formula II''

$$Y = IV \text{ with } R_6 = \text{methyl}$$
$$R_2 = \text{methyl}$$

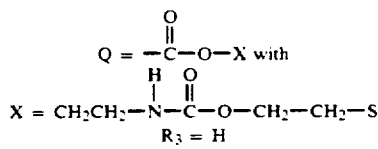

$$R_3 = H$$

400 g of 2 polymethyl methacrylate (PMMA) with hydroxyl end groups according to Example 1 was dissolved in anhydrous toluene to form a 40% solution. After addition of 1 g dibutyltin dilaurate as a catalyst and 20 g isocyanatoethyl methacrylate, the mixture was allowed to stand 16 hr at about 40° C., followed by addition of 50 g ethanol. After thinning with toluene, the product was precipitated out in methanol.

The resulting polymethyl methacrylate had a molecular weight Mw=27,100, and nonuniformity (U)=0.92.

Example 3

Polymerization method

Into a 2-liter reaction vessel having a stirrer and a gas introduction tube, 60 g of macromonomer of formula

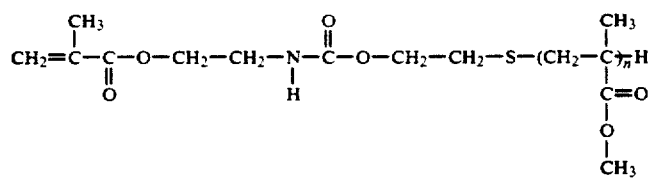

was charged. The macromonomer had a molecular weight Mw=10,700, and U=0.94. The following were added:

| | |
|---|---|
| 340.0 g | butyl acrylate. |

-continued

| | |
|---|---|
| 510.0 g | butyl acetate. |
| 0.2 g | 2-ethylhexyl thioglycolate, and |
| 0.8 g | tert-butyl perneodecanoate. |

The reaction mixture was polymerized 4 hr at 60° C., under argon as a protective gas. Then 0.1 g Tinuvin ® 770 was added, the polymer was precipitated out in methanol and dried in vacuum. The copolymer thus produced can be reformed by simple press forming if heated above 150° C. It is thus thermoplastically processible. The J-value of the copolymer was 338 ml/g.

Example 4

The EAR obtained according to Example 3 was dissolved in butyl acetate. The resulting solution was used to produce films by film casting, and the films were dried. The resulting 0.5 mm thick films were highly transparent and colorless, non-tacky, and highly elastic. The tensile strength of the material was 2.3 MPa, and the elongation at failure was 1215%.

Example 5

The copolymer obtained according to Example 3 was dissolved in butyl acetate, a styrene-acrylonitrile copolymer (SAN) was added in the amount of 1% (based on the weight of the copolymer according to Example 3), and films about 0.8 mm thick were produced by film casting. The films were transparent and colorless. Tensile strength Fmax=2.7 MPa. Elongation at failure =1100%.

Example 6

80 g of a macromonomer produced according to Example 2 and having the structure

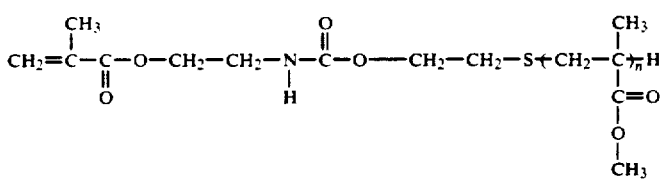

(Mw=27,100, Mn=14,100, U=(Mw - Mn)/Mn=0.92) was dissolved in 320 g butyl acrylate and 510 g butyl acetate according to Example 3, and polymerization was carried out, with addition of 0.1 g tert-butyl perneodecanoate, at an internal temperature of 60°-74° C., under argon as a protective gas. After completion of the main polymerization phase (about 1.5 hr after the start of the polymerization), an additional 0.2 g tert-butyl perneodecanoate was added, and reaction was continued another 1 hr at 60° C. under stirring.

Thereafter, 0.1 g Tinuvin ® 770 was added as a stabilizer, and the polymer solution was thinned with 900 g butyl acetate. After precipitation out in methanol and drying in vacuum at 50° C., a polymer was obtained, which was film cast from butyl acetate as the solvent, to form transparent colorless films which were dryable.

The molecular weight characterization of the resulting copolymer (A) is as follows:

$Mw=2,310,000; Mn=291,000; U=6.94.$

Thus, for this copolymer (A) with 20 wt.% macromonomer, $Mw_{Copolymer\ A} \times Xw_{Macromonomer}=2,310,000\times 0.2=462,000$; and accordingly the condition $Mw_{Copolymer\ A} \times Xw_{Macromonomer} > Mw_{Macromonomer}$ is met, since $462,000>27,100$.

The elongation at failure measurement on this EAR gave the following values:

Fmax (i.e. the maximum tension, the tension at failure) = 5.3 MPa.

Elongation at Fmax = 593%.

Example 7

EAR with 30 wt.% macromonomer in the copolymer

A polymerization according to Example 6 was carried out with 60 g of the macromonomer of Example 2, having a specific viscosity J=15 ml/g, and 140 g butyl acrylate, with addition of 0.05 g 5-butyl perneodecanoate, in 300 g butyl acetate. After precipitation out in methanol and drying, the resulting polymer had J=225 ml/g.

The stress at failure and elongation at failure of a film produced from the polymer were 10.3 MPa and 423%, respectively.

Example 8

320 g butyl acrylate, 0.2 g 2-ethylhexyl thioglycolate, and 510 g. butyl acetate were added to 80 g of a PMMA macromonomer according to Example 2 (J=19.6 ml/g), and the mixture was heated to 60° C. After addition of 0.4 g tert-butyl perpivalate, the polymerization was carried out in the temperature range 60°-90° C. Following cooling, the product was precipitated out in methanol and dried. The result was a clear, colorless polymer, J=145 ml/g.

From films which were film cast from the polymer, elongation at failure and tensile strength were 706% and 2.9 MPa, respectively.

Example 9

Production of a polymer (B) as a mixed-polymer component in the Copolymer according to Example 8

The following components were mixed and emulsified in 1,200 g distilled water in a polymerization vessel:

| | |
|---|---|
| 4,185 g | methyl methacrylate |
| 225 g | methyl acrylate |
| 45 g | propanetriol triacrylate |
| 45 g | allyl methacrylate |
| 2 g | 2-ethylhexyl thioglycolate |
| 45 g | tetradecanesulfonic acid, sodium salt (as emulsifier). |

After addition of 6 g potassium peroxydisulfate in 500 g water, and addition of 1 g 1% ferrous sulfate solution, argon was passed through the mixture, and the emulsion polymerization at 30° C was started by addition of 2 g $Na_2S_2O_5$ dissolved in 500 g water. The reaction was controlled such that the interior temperature did not exceed 80° C.

After cooling, a thin liquid emulsion polymer was obtained, from which fine crosslinked PMMA particles were obtained by cold coagulation and subsequent washing. These particles are dispersible in organic solvents.

Example 10

2.7 g of the emulsion polymer produced according to Example 9 were dispersed in butyl acetate. 27 g copolymer according to Example 8 was added, and the mixture was film cast to form a film, which was then dried.

The resulting polymer film had high tensile strength in comparison to unmodified film. The tensile strength (stress at failure) was 2.4 MPa. Elongation at failure was 515%.

Example 11

Production of the macromonomer

A mixture of 300 g methyl methacrylate, 200 g cyclohexyl methacrylate, 10 g mercaptoethanol, and 0.1 g AIBN was polymerized 24 hr at 40° C. followed by 24 hr at 50° C. The product was then precipitated out in methanol and dried in vacuum. Yield 200 g. J=9.8 ml/g.

150 g of the polymer obtained was dissolved in 250 g toluene. After addition of 12 g triethylamine and 12 g methacrylic acid anhydride, the mixture was heated to 45° C. and allowed to sit 24 hr at this temperature, under inert gas. The macromonomer was isolated by precipitation out in methanol. J=10.4 ml/g.

Example 12

Production of the copolymer

The following were mixed together:

| | |
|---|---|
| 120 g | macromonomer according to Example 11 |
| 280 g | butyl acrylate |
| 400 g | butyl acetate. | and the mixture was polymerized at 50° C., following addition of 0.05 g tert-butyl perpivalate.

After precipitation out in methanol and drying, a copolymer was obtained which was film cast from butyl acetate to form transparent colorless films.

J=323 ml/g. Tensile strength $\sigma_R=7.9$ MPa. Elongation at failure $\epsilon_R=478\%$.

Example 13

Production of a blend 18 g of the copolymer according to Example 12 and 2.35 g polystyrene (Polystyrol 158 K ® of BASF) (polystyrene is readily compatible with copolymers comprising units of cyclohexyl methacrylate and methyl methacrylate, see Ger. OS 36 32 369, of Mar. 17, 1986) were dissolved in toluene and were film cast to form a film. After drying, the resulting film had the following characteristics: Tensile strength $\sigma_R=8.9$ MPa. Elongation at failure $\epsilon_R=315\%$.

Thus in this case the tensile strength was increased by addition of a polymer compatible with the macromonomer.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. An acrylate elastomer, comprising
   (A) 60-100 wt.% of a copolymer having a weight-average molecular weight of from 100,000 to 10,000,000 daltons, said copolymer comprising monomer units of:
   (i) 50-95 wt.%, based on the total weight of monomer components of (A), of monomers having formula (I)

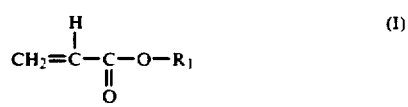

wherein $R_1$ is a $C_{1-12}$ hydrocarbon group,
   (ii) 5-50 wt.% of a macromonomers or macromonomer mixtures of formula (II)

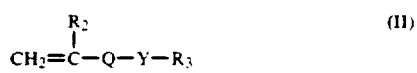

wherein $R_2$ is hydrogen or methyl, $R_3$ is hydrogen or a $C_{1-24}$ alkyl group, Q is C(O)OX, X being a $C_{2-24}$ alkylidene group or a $C_{2-24}$ alkylidene group in which one or more of the methylene groups of said alkylidene group are replaced with an oxygen, sulfur or nitrogen atom, and Y is a polymer chain of monomer units (IV)

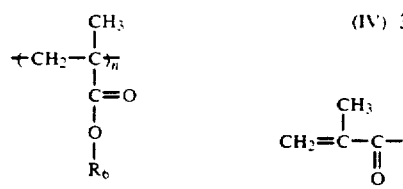

wherein $R_6$ is methyl, ethyl, isopropyl, cycloalkyl, phenyl or substituted phenyl, n is a number such that the weight average molecular weight of said macromonomer is in the range 500-100,000 daltons, and
   (iii) 0-45 wt.%, based on the sum of the weights of (i) and (ii), of a different vinyl compound which is copolymerizable with monomers (i) and (ii); and
   (B) 40-0 wt.% of a polymer not copolymerizable with monomer (i), said polymer comprising the monomer units of polymer chain Y and having a weight-average molecular weight in the range 500-100,000 daltons.

2. The elastomer of claim 1, comprising 60-99.9 wt.% of said copolymer, wherein said copolymer has a molecular weight in the range 100,000-1,000,000 daltons.

3. The elastomer of claim 1, comprising 70-90 wt.% monomers of formula I.

4. The elastomer of claim 1, comprising 10-30 wt.% of said macromonomers of formula II or III.

5. The elastomer of claim 1, wherein said macromonomer has a molecular weight in the range 2,000-50,000 daltons.

6. The elastomer of claim 5, wherein said macromonomer has a molecular weight in the range 5,000-30,000 daltons.

7. The elastomer of claim 1, comprising 0.1-20 wt.% of said different vinyl compound copolymerizable with monomers i) and ii).

8. The elastomer of claim 1, comprising 40-0.1 wt.% of said polymer B).

9. The elastomer of claim 1, wherein n is a number in the range 10-1,000.

10. The elastomer of claim 1, wherein $R_1$ is selected from the group consisting of ethyl, propyl, butyl, pentyl, hexyl and 2-ethylhexyl.

11. The elastomer of claim 1, wherein X is

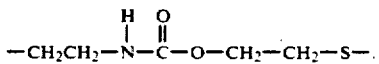

12. The elastomer of claim 1, comprising A) 60-99.9 wt.% of a copolymer comprising monomer units of
    i) 50-95 wt.% of ethylacrylate, butylacrylate, 2-ethylhexyl acrylate or mixtures thereof, and
    ii) 5-50 wt.% of a macromonomer of formula II' or II''

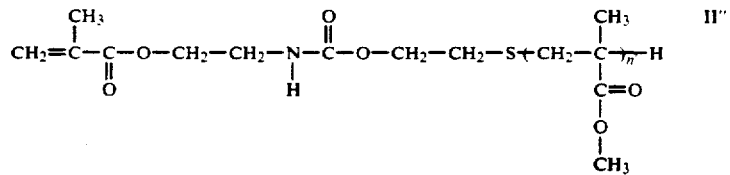

wherein n' is 10-1,000, and
B) 40-0.1 wt.% of a polymer comprised of monomer units having the structure

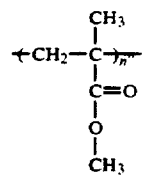

wherein n" is a number in the range 10-1,000.

13. The elastomer of claim 1, wherein Y is a polymethylmethacrylate polymer chain.

14. The elastomer of claim 1, wherein Q is —C(O)—O—(CH$_2$)$_2$—S— and $R_3$ is hydrogen.

* * * * *